United States Patent
Kuriyama et al.

(10) Patent No.: US 9,146,424 B2
(45) Date of Patent: Sep. 29, 2015

(54) LIQUID CRYSTAL DISPLAY DEVICE

(71) Applicant: Japan Display Inc., Tokyo (JP)

(72) Inventors: Hideki Kuriyama, Tokyo (JP); Hirotaka Imayama, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 20 days.

(21) Appl. No.: 14/040,956

(22) Filed: Sep. 30, 2013

(65) Prior Publication Data

US 2014/0092352 A1  Apr. 3, 2014

(30) Foreign Application Priority Data

Oct. 1, 2012 (JP) ................. 2012-219421

(51) Int. Cl.
*G02F 1/1343* (2006.01)
*G02F 1/139* (2006.01)
*G02F 1/1337* (2006.01)

(52) U.S. Cl.
CPC .... *G02F 1/133707* (2013.01); *G02F 1/134363* (2013.01); *G02F 2001/13373* (2013.01)

(58) Field of Classification Search
CPC ............. G02F 1/133707; G02F 2001/13373; G02F 1/134363
USPC ............ 349/42, 138, 139, 141, 143–146; 257/59, 72; 345/92
See application file for complete search history.

(56) References Cited

U.S. PATENT DOCUMENTS

| 2008/0074602 | A1* | 3/2008 | Arai et al. ............ 349/146 |
| 2011/0075085 | A1* | 3/2011 | Park .................... 349/141 |
| 2012/0099066 | A1* | 4/2012 | Ougiichi et al. ...... 349/138 |

FOREIGN PATENT DOCUMENTS

| JP | 2000-330123 A |   | 11/2000 |
| JP | 2013-097106 A | * | 5/2013 |

OTHER PUBLICATIONS

Computer translation of JP 2013-097106, May 2013, pp. 5-15.*

* cited by examiner

*Primary Examiner* — Dung Nguyen
*Assistant Examiner* — Tai Duong
(74) *Attorney, Agent, or Firm* — Lowe Hauptman & Ham, LLP

(57) ABSTRACT

Screen brightness is improved in an IPS type liquid crystal display device.
A common electrode having a slit is disposed over a rectangular pixel electrode with an insulating film attached therebetween. The slit has a linear part and a bend part. The bend part is necessary for preventing pressing domain. The transmittance in the bend part is increased by making the thickness of the insulating film below the bend part of the slit to less than the thickness of the insulating film at the linear part of the slit, thereby increasing the transmittance of the entire pixel. Thus, the screen brightness can be improved.

10 Claims, 11 Drawing Sheets

Y—Y

LIQUID CRYSTAL DISPLAY DEVICE

CLAIM OF PRIORITY

The present application claims priority from Japanese Patent Application JP 2012-219421 filed on Oct. 01, 2012, the content of which is hereby incorporated by reference into this application.

BACKGROUND OF THE INVENTION

1. Field of the Invention

The present invention relates to a display device and it particularly relates to a liquid crystal display device capable of improving the screen brightness.

2. Description of the Related Art

A conventional liquid crystal display device includes a TFT substrate having a pixel electrode, thin film transistors (TFT), etc. formed in a matrix; a counter substrate disposed in facing relation to the TFT substrate and having a color filter, etc. formed at portions corresponding to the pixel electrodes of the TFT substrate; and liquid crystals put between the TFT substrate and the counter substrate. Images are formed by controlling the transmittance of light for every pixel by liquid crystal molecules.

Since liquid crystal display devices are flat and light in weight, their application use has been extended in various fields. Small-sized liquid crystal display devices have been used generally for mobile phones and DSOs (Digital Still Cameras). The liquid crystal display devices involve a problem of a so-called viewing angle characteristics in which contrast or color changes when a screen is viewed from the oblique direction to the screen. For the viewing angle characteristics, IPS (In Plane Switching) liquid crystal display device (hereinafter referred as a IPS) have excellent characteristics.

While IPS include various IPS types, liquid crystal display devices of a type in which an insulating film is formed on a rectangular first electrode, over which a comb-shaped second electrode is disposed have been used generally so far. When the first electrode is a pixel electrode, the second electrode is a common electrode and, on the contrary, when the first electrode is a common electrode, the second electrode is a pixel electrode.

At the end of the comb-shaped electrode of the second electrode, a domain tends to be generated by reverse rotation of liquid crystal molecules. Particularly, touch panel systems have been popularized recently and, in this system, the surface of a liquid crystal display panel is touched by a finger or the like. Then, the liquid crystal molecules rotate by the pressure and it take a time to return to the initial state, to cause a problem of deteriorating image quality. The problem is hereinafter referred to as pressing domain. In order to overcome the problem, JP-A-2000-330123 describes a configuration of preventing generation of pressing domain by bending the top ends of the comb-teeth in a range of larger than 1° and smaller than 90°.

SUMMARY OF THE INVENTION

As the IPS system, a configuration of forming slits in a planar electrode instead of forming the upper second electrode in a comb-shape can provide the same operation as that in the case of forming the comb-shaped electrode. Then, the system has been used more generally. Description is to be made to an IPS system in which a first electrode as a lower electrode is formed in a rectangular shape, a second electrode as an upper electrode is formed as a planar electrode with slits thereon, and an insulating film is attached between the electrodes. Such IPS as described above includes a system called as IPS-PRO and as IPS-LITE. They are identical in the principle of operating liquid crystals but different in the layer structure of the electrode.

In IPS-LITE, the first electrode is a pixel electrode and a second electrode formed over an insulating film is a common electrode. On the other hand, in IPS-PRO, the first electrode may be either a pixel electrode or a common electrode. In the present specification, a system referred to as a so-called IPS-LITE is to be described as an example. In IPS-LITE, the first electrode has a rectangular outer profile, which is a solid-coated pixel electrode, while the second electrode is a common electrode which is formed as a transparent electrode over the entire display region and slits are formed to a portion corresponding to the pixel electrode.

For preventing pressing domain, it is necessary to bend the end of the slit. The highest voltage on the pixel electrode and the common electrode is set to a voltage that the transmittance of liquid crystals is highest. However, when the bend part is present at the end of the slit, the voltage-transmittance characteristics of the portion are different from that of the linear part of the slit.

However, since the application voltage is determined conforming to the linear part that occupies a large area of the slits, the transmittance characteristics of the bend part at the end of the slit are not optimized and the screen brightness of the liquid crystal display device is sacrificed by so much. The present invention intends to improve the transmittance characteristics in the bend part at the end of the slit and provide a liquid crystal display device capable of obtaining a higher screen brightness.

The present invention intends to overcome the problems described above and specifically includes the configuration as described below. That is, in a liquid crystal display device including a TFT substrate having pixels formed in a matrix, a counter substrate located opposite to the TFT substrate, the counter substrate having a color filter and a black matrix formed thereover, and liquid crystals put between the substrates, wherein the TFT substrate includes a first electrode formed by solid-coating, an insulating film formed over the first electrode, and a second electrode having a slit at a portion opposing the first electrode formed over the insulating film, the slit includes a linear part and a bend part contiguous with the end of the linear part, and when the insulating film has a thickness of t1 below a linear part and a thickness of t2 at a bend part, a relation of $t2/t1 \leq 0.8$ is satisfied.

DESCRIPTION OF THE PREFERRED EMBODIMENTS

Figure 1:
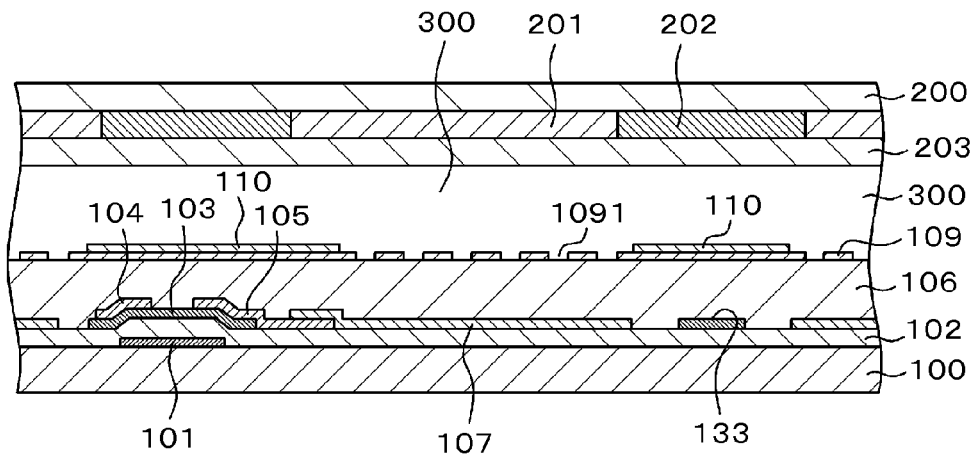
FIG. 1 illustrates a cross sectional structure of IPS-LITE.

FIG. 1 illustrates a liquid crystal display device of a type referred to as IPS-LITE and FIG. 1 is a cross sectional view of a so-called common electrode top type. In FIG. 1, a gate electrode 101 is formed over a TFT substrate 100 formed of glass and a gate insulating film 102 is formed to cover them. The gate electrode 101 is formed of an Al alloy, MoW alloy, or MoCr alloy, or a stacked film thereof.

A semiconductor layer 103 is formed over the gate electrode 101 while putting the gate insulating film 102 therebetween. Over the semiconductor 103, a drain electrode 104 and a source electrode 105 are formed opposing each other putting a channel region therebetween. The drain electrode 104 is connected to a video signal line (drain line) 133 in a not illustrated place. The drain electrode 104 and the source electrode 105 are each formed of an Al alloy, MoW alloy, or MoCr alloy, or a stacked film thereof. A layer formed simultaneously with the drain electrode 104 or the source electrode 105 is hereinafter referred to as a SD layer.

In FIG. 1, after forming of the drain electrode 104 and the source electrode 105, a pixel electrode 107 is formed of ITO in solid-coating in a rectangular shape without an insulating film. A video signal line 133 formed simultaneously with the SD layer is present between a pixel electrode and an adjacent pixel electrode. The pixel electrode 107 may be formed not after, but before forming of the source electrode 105. In the latter case, the configuration has a structure in which a portion of the pixel electrode 107 is put between the source electrode 105 and the insulating film 102.

An inorganic passivation film 106 of SiN or the like is formed over the pixel electrode 107 and a common electrode 109 having a slit 1091 in the pixel portion is formed over the inorganic passivation film 106. A common electrode 109 is formed in the entire pixel in common and slits are formed only at the portion of the pixel. In FIG. 1, a common metal 110 is formed over the common electrode 109 at a portion where light does not transmit for making the potential on the common electrode 109 uniform. However, such common metal 110 is used only for some products and not used for all products. The common metal 110 is formed of an Al alloy, MoW alloy, or MoCr alloy, or a stacked film thereof. The pixel electrode 107 and the common electrode 109 are formed of a transparent conductive film comprising ITO or the like. An alignment film to be formed over the common electrode or the common metal is not illustrated in FIG. 1.

In FIG. 1, a counter substrate 200 is provided over the TFT substrate with the liquid crystal layer 300 put therebetween. On the counter substrate 200, a black matrix 202 and a color filter 201 are formed, and an overcoat film 203 is formed to cover them. An alignment film to be formed over the overcoat film 203 is not illustrated in FIG. 1. In the TFT substrate 100 in FIG. 1, when a voltage is applied to the pixel electrode 107, lines of electric forces are generated through the slits 1091 between the common electrode 109 and the pixel electrode 110, to rotate the liquid crystal molecules 301 and control the transmittance of the liquid crystals 300 for every pixel thereby forming images. The present invention is to be described specifically by way of preferred embodiments.

First Embodiment

Figure 2:
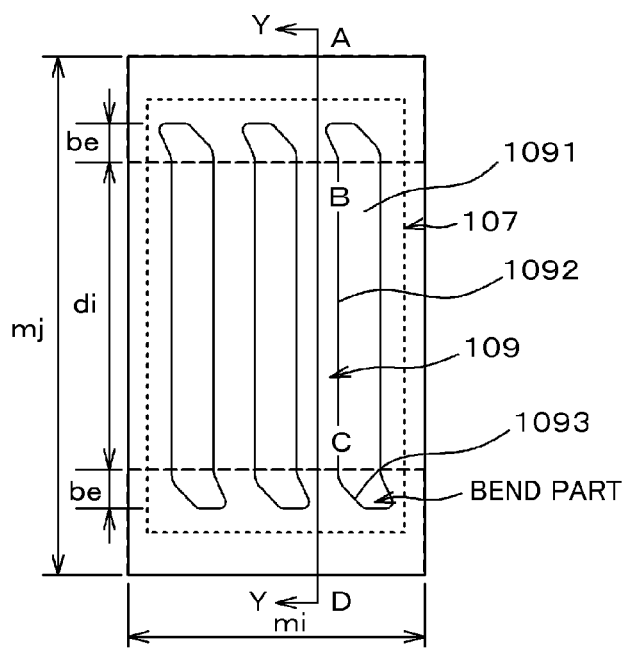
FIG. 2 is a plan view illustrating a pixel electrode and a common electrode.

FIG. 2 is a plan view for one pixel in a TFT substrate. In FIG. 2, a common electrode 109 having slits 1091 is formed over a rectangular pixel electrode 107 shown by a dotted line with a not illustrated insulating film (inorganic passivation film) attached therebetween. In FIG. 2, the TFT is not illustrated. The pixel has a size, for example, 50 μm of a major diameter "mj", and 30 μm of a minor diameter "mi", and the length "di" of the linear part 1092 of the slit 1091 is 30 μm and the length "be" of the bend part 1093 at the end of the slit 1091 is 3 μm. Since two bend parts 1093 are provided at the upper and lower parts, the total length is 6 μm.

In FIG. 2, a portion below the three slits 1091 shown by the dotted rectangular shape is a pixel electrode 107 which has a rectangular profile and formed by solid-coating. Upper and lower dotted portions in FIG. 2 are regions including the bend parts 1093 of the slits 1091. In FIG. 2, when a voltage is applied to the rectangular pixel electrode 107, lines of electric force passing through the slits 1091 are generated between the pixel electrode 107, which rotate liquid crystal molecules and control the transmittance of the liquid crystal layer. Images are formed by controlling the transmittance for every pixel.

Figure 3:
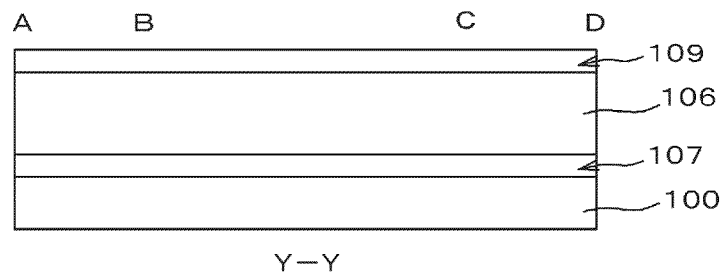
FIG. 3 is a cross sectional view between a pixel electrode and a common electrode in an conventional embodiment.

FIG. 3 is a cross sectional view along line Y-Y in FIG. 2 in the conventional embodiment. In FIG. 3, A, B, C, and D correspond to the positions A, B, C, and D in FIG. 2. In FIG. 3, a pixel electrode 107 is formed over a TFT substrate 100, on which an inorganic passivation film 106 as an insulating film is formed, and a common electrode 109 having slits 1091 are formed thereover. In the conventional embodiment, the insulating film 106 has a constant thickness over the entire common electrode 109. In FIG. 3, layers below the pixel electrode 107 are not illustrated.

Figure 4:
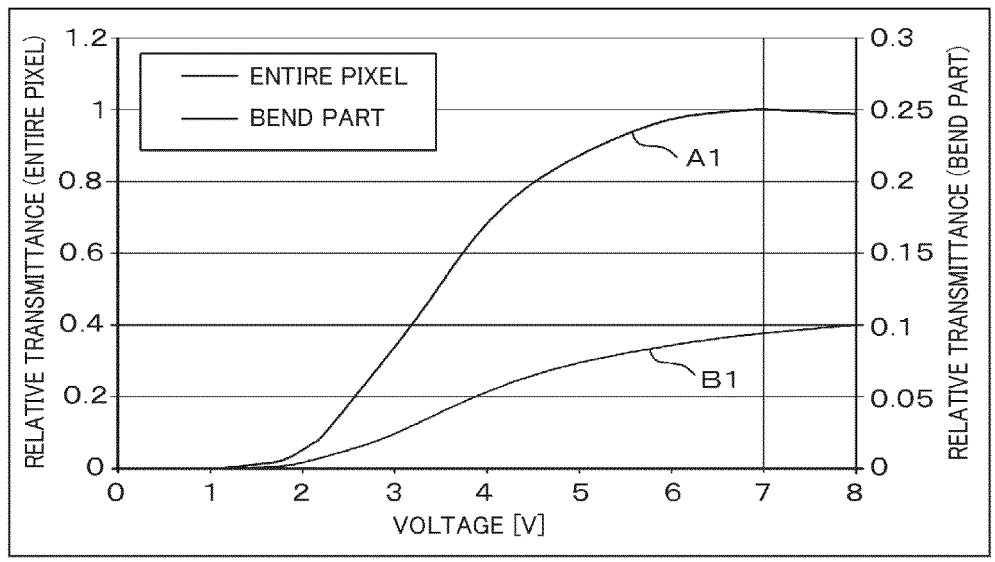
FIG. 4 is a graph showing a voltage between a pixel electrode and a common electrode and transmittance characteristics of the pixel in the conventional embodiment.

The transmittance of the liquid crystal layer changes depending on the voltage between the pixel electrode 107 and the common electrode 109. The highest voltage between the pixel electrode 107 and the common electrode 109 is determined so that the transmittance of the liquid crystal layer is at the maximum. FIG. 4 is a graph showing a relation between the voltage and the transmittance of the entire pixel. In FIG. 4, the abscissa represents a voltage between the pixel electrode 107 and the common electrode 109, and the left ordinate represents a relative value showing the transmittance of the entire pixel. The highest transmittance of the entire pixel is assumed as 1. The right ordinate is a value showing the transmittance of the region surrounded by the dotted line in FIG. 2 including the bend parts of the slits 1091. The value shows the relative transmittance assuming the maximum transmittance of the entire pixel being as 1.

In FIG. 4, a curve Al shows a relation between the voltage and the transmittance of the entire pixel, and a curve B1 shows a relation between the voltage and the transmittance only for the region surrounded by the dotted line in FIG. 2 including the bend parts of the slits 1091. In the graph, values on the curve A1 and B1 corresponds to values on the left and right ordinate, respectively.

The curve Al showing the transmittance of the entire cell is set such that the transmittance is at the maximum when the voltage between the pixel electrode and the common electrode is at 7 V. In FIG. 4, the relative transmittance at a voltage of 7 V is set as 1. As the voltage displaces from 7 V, the transmittance lowers.

However, the voltage that maximizes the transmittance of liquid crystals is different depending on the shape of the slit 1091. As can be seen from the curve B1 showing the transmittance at the bend part 1093 of the slit 1091 in FIG. 4, the maximum transmittance is present at a higher voltage. On the other hand, since the linear part 1092 occupies more area in the slit 1091 as illustrated in FIG. 2, the voltage is set so that the transmittance is at the maximum in the linear part 1092. However, it is impossible in the slit 1091 to apply different voltages between the linear part 1092 and the bend part 1093, thereby a compromise has been adopted as a conventional manner such that the same voltage is applied to the both parts to obtain the maximum brightness as a whole.

Figure 5:
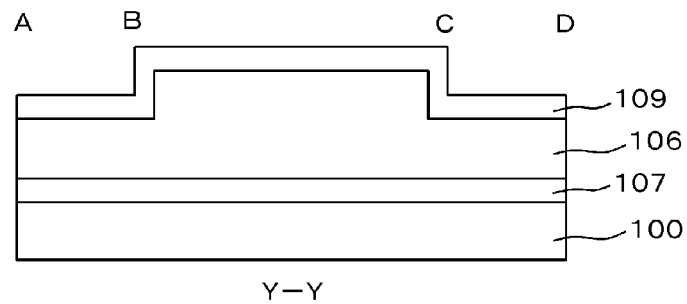
FIG. 5 is a cross sectional view between a pixel electrode and a common electrode in the present invention.

FIG. 5 is a cross sectional view along line Y-Y in FIG. 2 in the invention. In FIG. 5, A, B, C, and D correspond to the positions A, B, C, and D in FIG. 2. In FIG. 5, a pixel electrode 107 is formed over a TFT substrate 100, an inorganic passivation film 106 as an insulating film is formed thereover, and a common electrode 109 having slits 1091 is formed further thereover. In FIG. 5, layers below the pixel electrode 107 are not illustrated.

The configuration in FIG. 5 has a feature that the thickness of the insulating film 106 is reduced in A-B and C-D as the bend part 1093 of the slit 1091 than that in B-C which is a linear part 1092 of the slit 1091. Accordingly, in the bend part 1093 of the slit 1091, the electric field strength between the pixel electrode 107 and the common electrode 109 is stronger than that of the linear part 1092 of the slit 1091. That is, the same effect of increasing the voltage between the pixel electrode 107 and the common electrode 109 can be obtained in the bend part 1093, when the insulating film 106 has an identical thickness. Accordingly, by adopting the layer structure of the invention as illustrated in FIG. 5, the transmittance of the bend part 1093 can be increased and, the brightness of the liquid crystal display device can be improved entirely.

Figure 6:
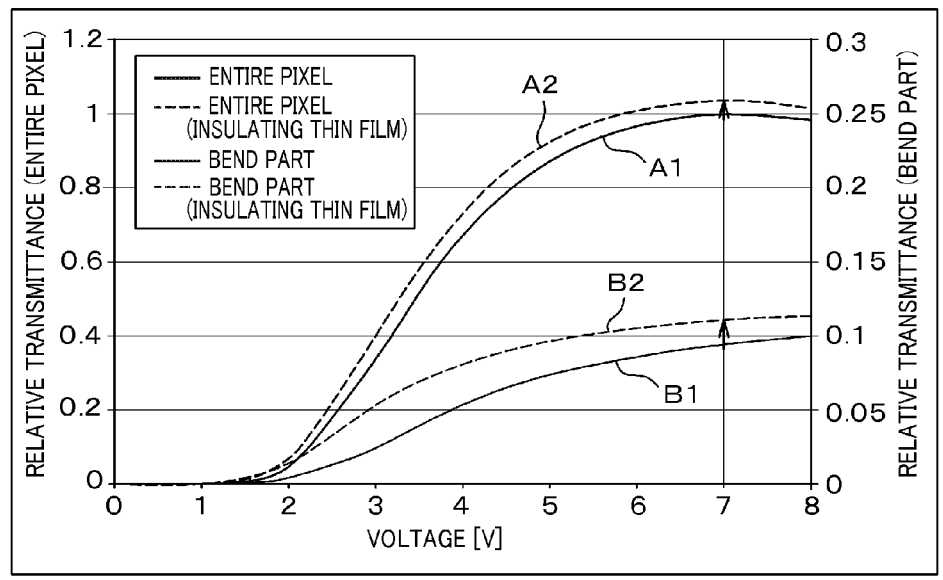
FIG. 6 is a graph showing a voltage between a pixel electrode and a common electrode and transmission characteristics of the pixel in comparison between the present invention and the conventional embodiment.

FIG. 6 is a graph showing the effect of the invention. In FIG. 6, the abscissa represents a voltage between the pixel electrode 107 and the common electrode 109, and the left ordinate represents a relative value showing the transmittance of the entire pixel. The maximum transmittance of the entire pixel is assumed as 1. The right ordinate represents a value showing the transmittance of the slit 1091 for a portion surrounded by the dotted line in FIG. 2 including the bend part 1093. The value shows a relative transmittance to the maximum transmittance of the entire pixel being assumed as 1.

In FIG. 6, a curve 31 shows the transmittance of a portion surrounded by the dotted line in FIG. 2 including the bend part 1093 of the slit 1091 in the conventional example and a curve B2 shows the transmittance of a portion surrounded by the dotted line including the bend part 1093 of the slit 1091 of the invention. The transmittance of the entire cell increases by so much as the increase of the transmittance from the curve B1 to the curve B2. In FIG. 6, A1 shows the transmittance of the entire pixel in the conventional example and A2 indicated by the dotted line shows the transmittance of the entire cell according to the invention. The transmittance increases also for the entire pixel by so much as the increase of the transmittance in the bend part 1093. In the graphs of FIG. 6 transmission is evaluated to a case where the thickness of the inorganic passivation film 106, which is an insulating film in the linear part 1092 of the slit 1091, is 500 nm and the thickness of the inorganic passivation film 106, which is the insulating film in the bend part 1093 of the slit 1091, is 100 nm.

Figure 7:
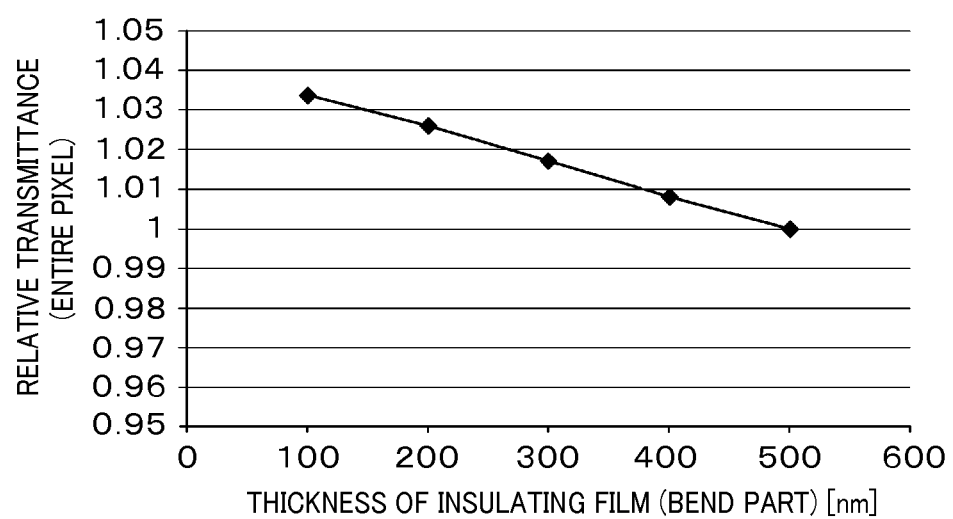
FIG. 7 is a graph showing the change of transmittance of a pixel when the thickness of an insulating film below the bend part of the slit is changed.

FIG. 7 is a graph showing the change of the transmittance of the pixel along with the change of the thickness of the insulating film 106 at the bend part 1093 of the slit 1091. In FIG. 7, the abscissa represents the thickness of the insulating film 106 at the bend part 1093 of the slit 1091 and the ordinate represents the transmittance of the pixel. At 500 nm thickness on the abscissa, the thickness of the insulating film 106 is equal between the linear part 1092 and the bend part 1093 of the slit 1091. In this case, the transmittance ratio on the ordinate is assumed as 1. That is, the transmittance of the conventional example is assumed as 1.

In FIG. 7, the transmittance increases as the thickness of the insulating film 106 at the bend part 1093 of the slit 1091 decreases. When the thickness of the insulating film at the bend part 1093 is set to 400 nm, the transmittance, that is, the brightness as the entire pixel is improved by about 1%. Since there is a strong demand for power saving in cell-driven mobile products, it can be said that the effect is significant even for 1% improvement. At the thickness of the insulating film for the bend part 1093 of 250 nm, the transmittance, that is, the brightness of the entire pixel is improved by about 2%. At the thickness of the insulating film in the bend part 1093 of 100 nm, the transmittance, that is, the brightness of the entire pixel is improved by about 3.4%.

That is, the brightness is improved by 1% when the thickness of the insulating film 106 at the bend part 1093 of the slit 1091 is set to ⅘ of the thickness of the insulating film 106 at the linear part 1092 of the slit 1091; the brightness is improved by 2% when the thickness of the insulating film 106 at the bend part 1093 of the slit 1091 is set to ½ of the thickness of the insulating film 106 at the linear part 1092; and further, the brightness is improved by 3.4% when the thickness of the insulating film 106 at the bend part 1093 of the slit 1091 is set to ⅕ of the thickness of the insulating film 106 at the linear part 1092.

Figure 8A:
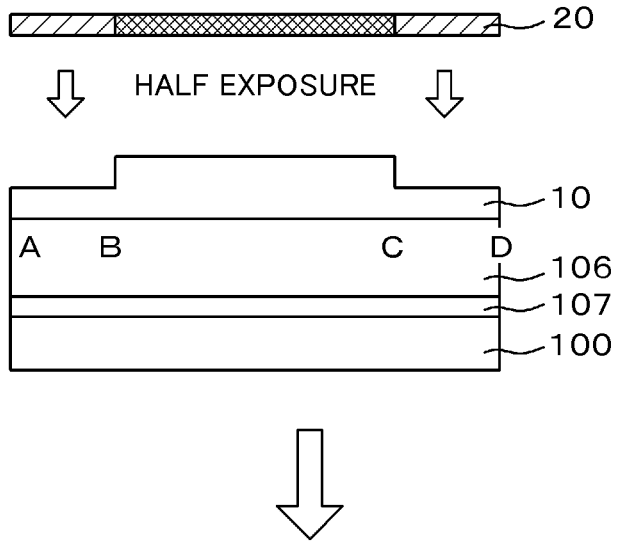
FIGS. 8A to 8C are schematic cross sectional views illustrating a process of changing the thickness of the insulating film between a pixel electrode and a common electrode.

FIG. 8 is an example of a process for realizing the configuration of the invention. FIG. 8 is an example using half-tone exposure. In FIG. 8(A), a pixel electrode 107 is formed over a TFT substrate 100, on which an inorganic passivation film 106 as an insulating film is formed. A, B, C, and D in FIG. 8 correspond to A, B, C, and D in FIG. 2. In FIG. 8, a configuration below the pixel electrode 107 is not illustrated. Subsequently, a resist 10 is formed over the insulating film 106 and exposed by using a half-tone mask 20. When it is developed, a resist 10 at the half-tone part is formed thinly.

Figure 8B:
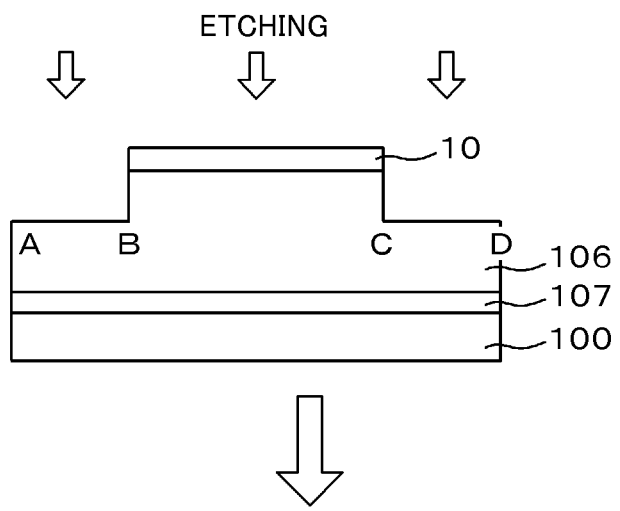

Then, when etching is performed by dry etching or the like, the resist 10 is scraped at first, in which the resist 10 at the regions A-B and C-D corresponding to the bend part 1093 of the slit 1091 having a thinned resist is eliminated. As etching is continued further, the insulating film 106 is scraped at the regions A-B and C-D and becomes thinner as illustrated in FIG. 8(B).

Figure 8C:
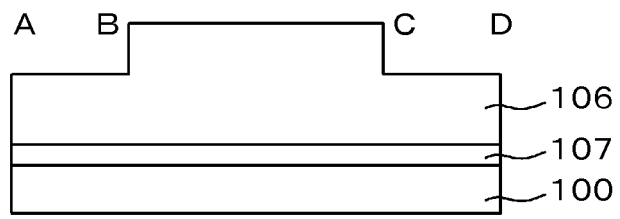

Etching is further continued until the resist 10 disappears in the regions B-C corresponding to the linear part 1092 of the slit 1091. Then, as illustrated in FIG. 8(C), a configuration in which the thickness of the insulating film 106 is reduced in the regions A-B and C-D corresponding to the bend part 1093 of the slit 1091 can be obtained. The difference of the thickness between the portion for the region B-C and the portion for the regions A-B and C-D can be controlled by the difference of the thickness of the resist 10 in FIG. 8(A). That is, the difference of film thickness of the insulating film 106 can be controlled by controlling the transmittance of the half-tone part in the half-tone mask 20.

Figure 9:
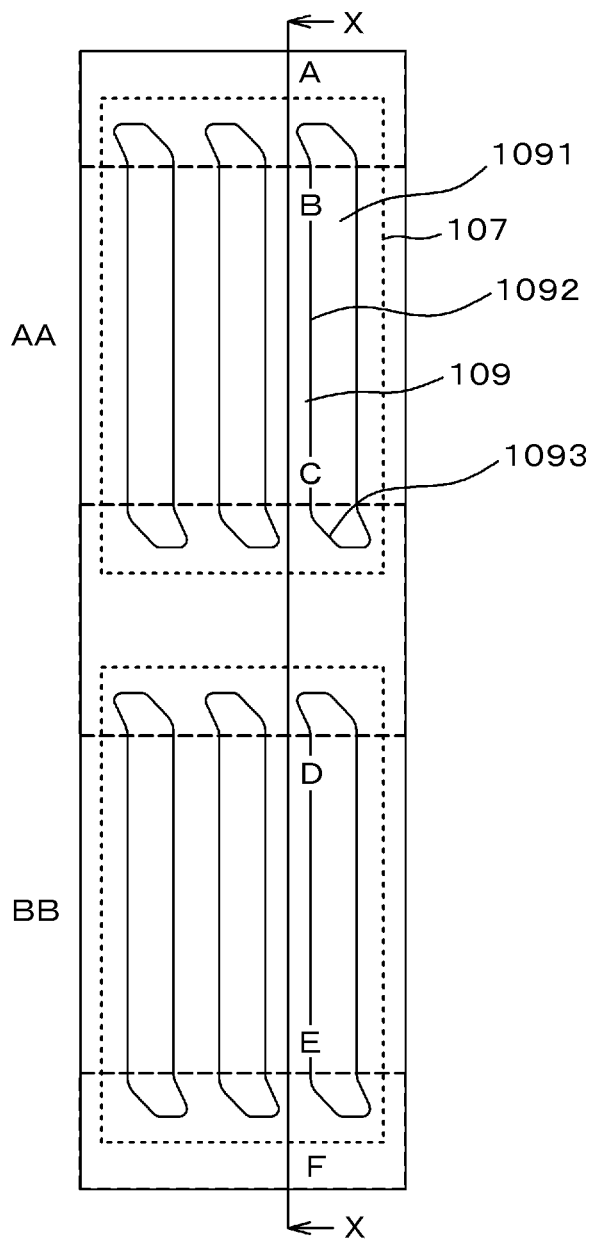
FIG. 9 is a plan view in which pixels are arranged by two in a longitudinal direction according to the present invention.

FIG. 9 is a plan view in which pixels of the invention are arranged by two in the longitudinal direction. The configuration of FIG. 9 is identical with that of FIG. 2 in which pixels are arranged longitudinally. The cross sectional view in each of the pixels is identical with that of FIG. 5, etc. In FIG. 9, the performance and the production yield, etc. of products undergo the effect depending on how the thickness of the insulating film 106 is formed at a boundary region between the upper pixel AA and the lower pixel BB.

Figure 10:
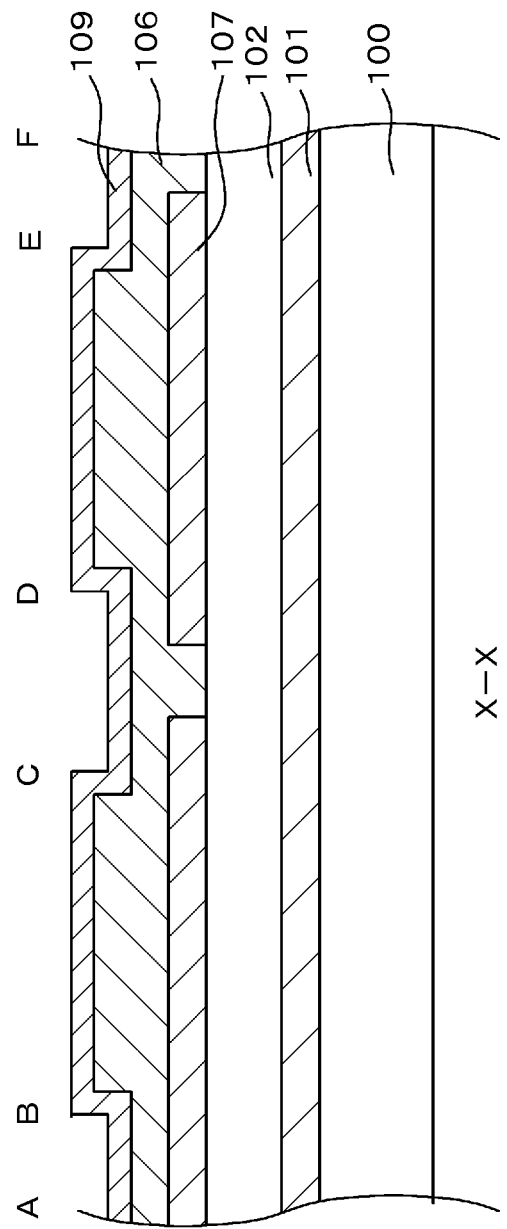
FIG. 10 illustrates an example of a X-X cross sectional view in FIG. 9.

FIG. 10 illustrates a first example of a cross sectional view along line X-X in FIG. 9. In FIG. 10, a gate electrode 101 is formed over a TFT substrate 100, on which a gate insulating film 102 is formed. A pixel electrode 107 is formed over the gate insulating film 102 and an insulating film 106 as an inorganic passivation film is formed over the pixel electrode 107. The thickness of the insulating film 106 is larger at the linear part 1092 of the slit 1091 of the pixel illustrated in FIG. 9 and the thickness is smaller in a region including the bend part 1093 of the slit 1091 illustrated by the dotted line in FIG. 9.

In FIG. 10, a common electrode 109 is formed over an insulating film 106. A bend part 1093 of a slit 1091 is formed to portions A-B, C-D, E-F in FIG. 10, and a linear part 1092 of the slit 1091 is formed at the portions B-C and D-E. The bend part 1093 of the slit 1091 of the upper pixel AA and the lower pixel BB in FIG. 9 are present at a portion C-D of FIG. 10. In the configuration of FIG. 10, since the insulating film 106 at the boundary of the two pixels is kept in an identical reduced thickness, the cross sectional shape is simple and can cope with also to a case where the longitudinal pitch in FIG. 9 is decreased.

Figure 11:
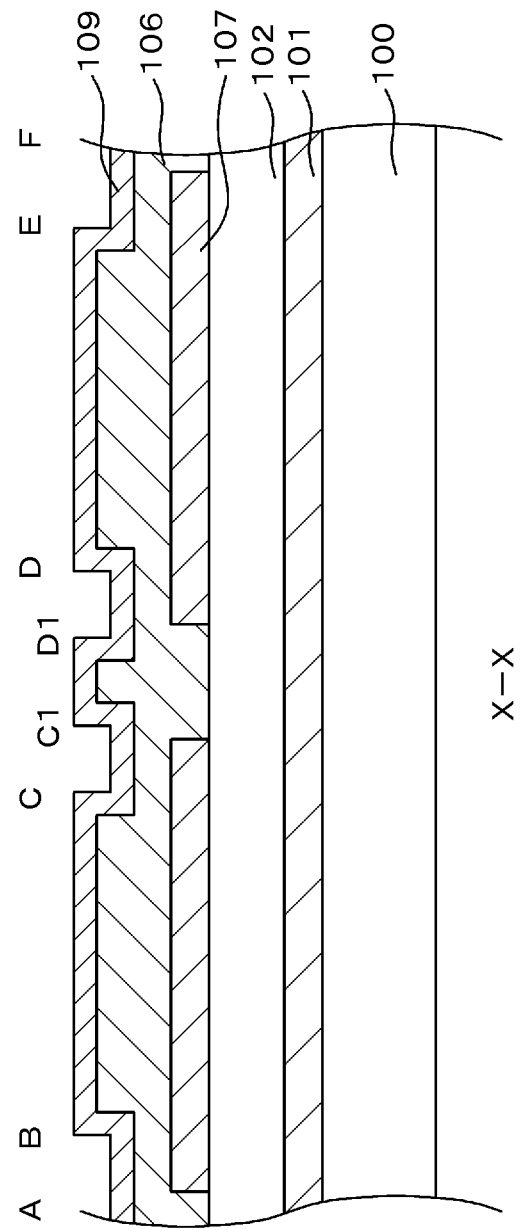
FIG. 11 illustrates another example of a X-X cross sectional view in FIG. 9.

FIG. 11 illustrates a second example of a cross sectional view along line X-X in FIG. 9. In FIG. 11, the configuration under the insulating film 106 is identical with that which has been described with reference to FIG. 10. FIG. 11 is different from FIG. 10 in the thickness of the insulating film 106 which is an inorganic passivation membrane at the boundary between a pixel and an adjacent pixel thereof. In FIG. 11, the thickness of the insulating film 106 is decreased at a portion corresponding to the bend part 1013 of the slit 1091 but the thickness for other portion, that is, the insulating film 106 at a portion C1-D1 in FIG. 11 has the thickness identical with that at the linear part 1092 of the slit 1091.

The structure shown in FIG. 11 has the following advantages. That is, a capacitance is present between the common electrode 109 and the gate electrode 101 at a portion where the pixel electrode 107 is not present, and it is preferred that the capacitance is smaller. When the thickness of the inorganic passivation film 106 is decreased, capacitance between the common electrode 109 and the gate electrode 101 is increased. However, as illustrated in FIG. 11, when the thickness of the insulating film 106 for the portion other than the portion where the bend part 1093 of the slit 1091 is present is made identical with the thickness of the insulating film 106 of the linear part 1092 of the slit 1091, capacitance between the common electrode 109 and the gate electrode 101 can be decreased.

Second Embodiment

Figure 12:
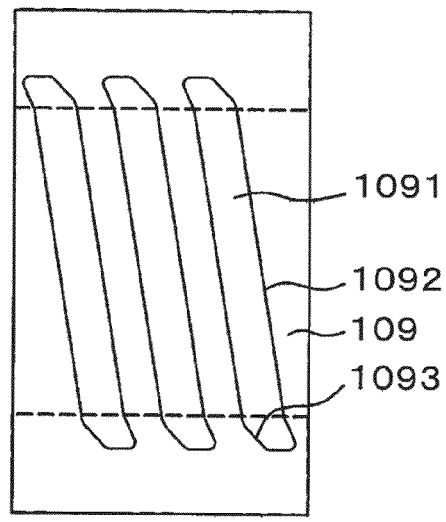
FIG. 12 is a plan view of a common electrode in a second embodiment.

FIG. 12 is a plan view of a common electrode 109 in a pixel portion that illustrates a second embodiment of the invention. In FIG. 12, the pixel electrode 107 is not illustrated. This embodiment is different from the first embodiment with respect to the shape of the slit 1091 in the common electrode 109. A linear part 1092 of the slit 1091 in FIG. 12 is slanted by a predetermined angle of 45° or less relative to the longer side of the pixel different from the embodiments of FIG. 2, etc. The longer side of the pixel may also be referred to as a longer side of the pixel electrode 107.

In a not illustrated pixel adjacent with the pixel illustrated in FIG. 12, the linear part 1092 of the slit 1091 in the common electrode 109 is slanted in an opposite direction to the slanting of the slit 1091 illustrated in FIG. 12. With such a configuration, the viewing angle characteristics can be made more uniform. Also in FIG. 12, transmittance at the bend part 1093 of the slit 1091 can be improved and the screen brightness can be increased entirely by decreasing the thickness of the insulating film 106 at the bend part 1093 of the slit 1091 in the same manner as in the first embodiment.

Third Embodiment

Figure 13:
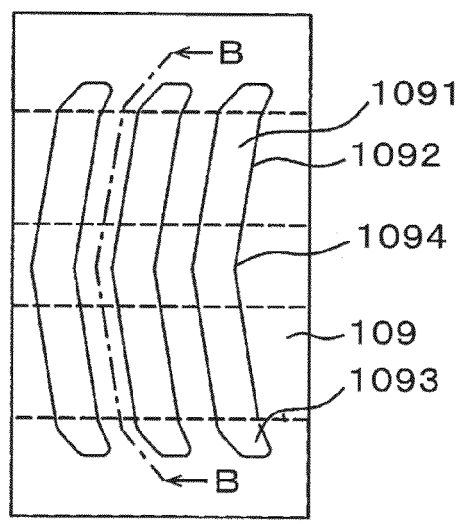
FIG. 13 is a plan view of a common electrode in a third embodiment.

FIG. 13 is a plan view of a common electrode 109 in the pixel portion that illustrates a third embodiment according to the invention. In FIG. 13, the pixel electrode 107 is not illustrated. This embodiment is different from the first embodiment in that the slit 1091 in the common electrode 109 is not linear but in a dog-legged shape.

In FIG. 13, the slit 1091 has a configuration comprising: a first linear part 1092 slanted at an angle of 45° or less relative to the longer axis of the pixel; a second linear part 1092 slanted by an angle of 45° or less in the opposite direction relative to the longer axis of the pixel; a first bend part 1093 contiguous with the first linear part 1092; and a second bend part 1093 contiguous with the second linear part 1092. With such a slit configuration, unevenness of the viewing angle characteristics within 1 pixel can be eliminated. The longer side of the pixel may also be referred to as the longer side of the pixel electrode 107.

In FIG. 13, the voltage-transmittance characteristics at the bend part 1094 where the first linear part 1092 and the second linear part 1092 are contiguous is different from the voltage-transmittance characteristics at the linear part 1092, and the region generating the maximum transmittance is shifted to the side of a higher voltage compared with the linear part 1092. Accordingly, transmittance can be improved by decreasing the thickness of the insulating film 106 in a region including the bend part 1094 compared with that at the linear part 1092 in the same manner as explained for the first embodiment. Accordingly, in this embodiment, a thinned region of the insulating film 106 is formed at the bend part 1093 on both ends of the slit 1091 and the bend part 1094 at the central portion of the slit 1091, that is, at three positions in total. Thus, transmittance of the entire pixel can be improved.

Fourth Embodiment

Figure 14:
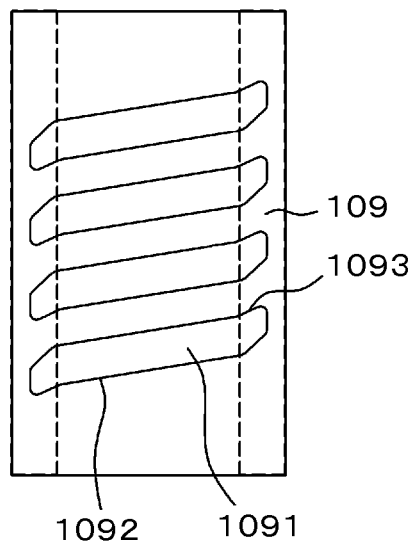
FIG. 14 is a plan view of a common electrode in a fourth embodiment.

FIG. 14 is a plan view of a common electrode 109 in a pixel portion that illustrates a fourth embodiment of the invention. In FIG. 14, the pixel electrode 107 is not illustrated. This embodiment is different from the second embodiment in that slits 1091 in the common electrode 109 are not formed in the longitudinal direction but in the lateral direction. In FIG. 14, the linear part 1092 of the slit 1091 is slanted at a predetermined angle of 45° or less relative to the shorter axis of the pixel. The bend parts 1093 of the slits 1091 are different from the first embodiment, etc. in that the bend part are present on the longer side. Accordingly, a region where the thickness of the insulating film 106 comprising the inorganic passivation film is decreased is present on the longer side of the pixel. The shorter axis of the pixel may also be referred to as the shorter axis of the pixel electrode 107.

In a not illustrated pixel adjacent to the pixel illustrated in FIG. 14, the linear part 1092 of the slit 1091 of the common electrode 109 is slanted in the opposite direction to the slanting of the slit 1091 illustrated in FIG. 14. With such a constitution, the viewing angle characteristics can be made more uniform.

In this embodiment, since the slits 1091 of the common electrode 109 are arranged laterally, the ratio of the area occupied by the bend part 1093 of the slit to the area of the entire slit is larger compared with the case where the slits 1091 are in the longitudinal direction as illustrated in the first to third embodiments. That is, since the ratio of the area for the bend part 1093 is larger, the effect of improving the transmittance by decreasing the thickness of the insulating film 106 at the bend part 1093 of the slit 1091 is greater compared with other embodiments.

Fifth Embodiment

Figure 15:
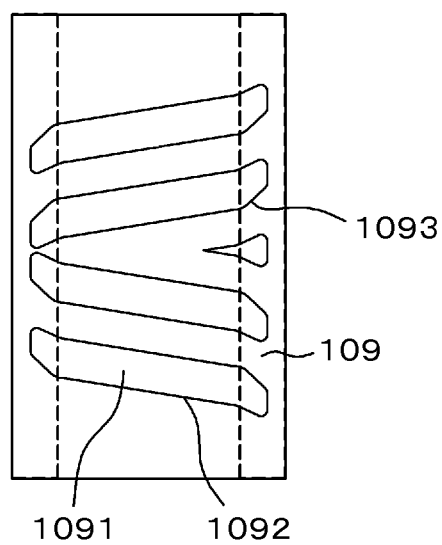
FIG. 15 is a plan view of a common electrode in a fifth embodiment.
Figure 16:
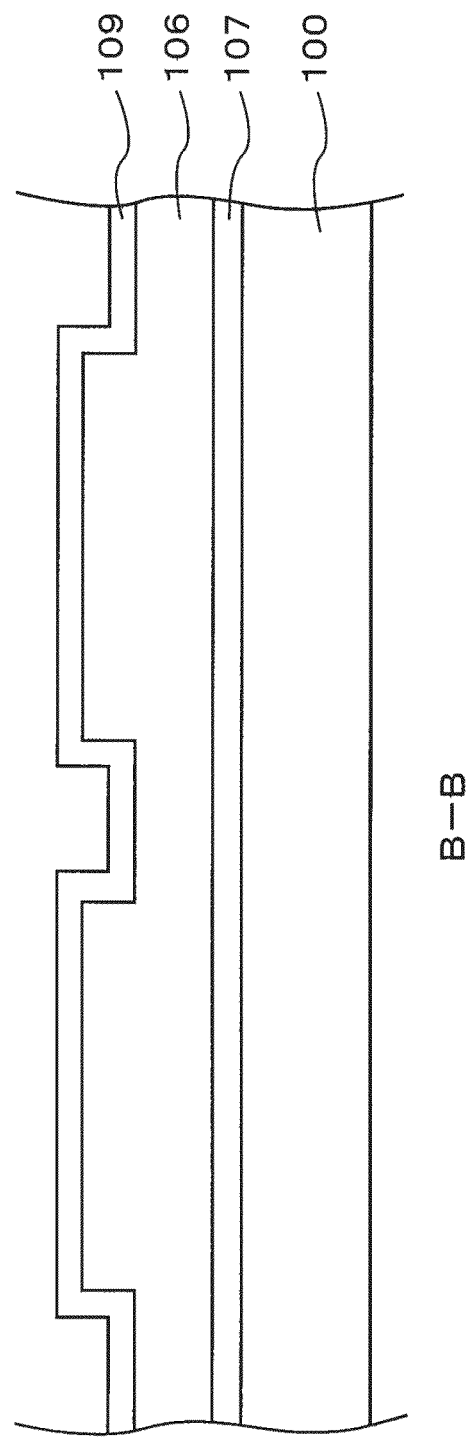
FIG. 16 illustrates a cross sectional view along the line B-B of FIG. 13.

FIG. 15 is a plan view of a common electrode 109 in the pixel portion that illustrates a fifth embodiment of the invention. In FIG. 15, the pixel electrode 107 is not illustrated. Also in this embodiment, slits 1091 are arranged laterally in the same manner as in the fourth embodiment. This embodiment of FIG. 15 is different from the fourth embodiment of FIG. 14 in that slanting of the slit 1091 of the common electrode 109 is in the opposite direction with respect to the shorter axis of the pixel. The shorter axis of the pixel may also be referred to as a shorter axis of the pixel electrode 107.

In FIG. 15, the upper slits 1091 in the pixel are slanted each by a predetermined angle of 45° or less relative to the shorter axis of the pixel, and the lower slits 1091 of the pixel are slanted each by a predetermined angle of 45° or less in the opposite direction to the shorter axis of the pixel. With such a configuration of the slit, unevenness in the viewing angle characteristics can be eliminated in 1 pixel.

In FIG. 15, the bend parts of the slits 1091 are present on the longer side of the pixel. Accordingly, a thin portion of the insulating film 106 is present on the longer side of the pixel. Also in this embodiment, since the slits 1091 of the common electrode 109 are arranged in the lateral direction, the ratio of the area occupied by the bend part 1093 of the slit in the area of the entire slit is larger compared with a case where the slits 1091 are arranged in the longitudinal direction shown in the first to third embodiments. That is, since the ratio of the area of the bend part 1093 is large, the effect of improving the transmittance by decreasing the thickness of the insulating film 106 at the bend part 1093 of the slit 1091 is larger compared with the first to third embodiments.

While the embodiments described above have been explained on the basis of the so-called IPS-LITE structure but the invention is applicable also to the so-called IPS-PRO. IPS-PRO includes a case where the first electrode in the lower layer is a pixel electrode and the second electrode in the upper layer is a common electrode, and a case where the first electrode in the lower layer is a common electrode and the second electrode in the upper layer is a pixel electrode, and the present invention is applicable to either of the cases.

While the first electrode is formed by solid-coating, it may be a structure in which a portion other than the slit of the second electrode is removed. Further, it is not always necessary to decrease the entire thickness of the insulating film at the bend part but the thickness of the insulating film may be decreased from the midway of the bend part. On the contrary, a structure where the thickness to the insulating film is decreased from the linear part may also be used. There may be also a configuration in which the thickness of the insulating film is decreased at a gradient from the linear part to the top end of the bend part by changing an etching method for the insulating film, etc. In this case, it may suffice that at least the thickness of the insulating film at the top end of the bend part meets the condition of the invention. Further, a portion with reduced thickness of the insulating film, entire or part of the portion, may be exposed from the black matrix 202 formed to the counter substrate.

What is claimed is:

1. A liquid crystal display device comprising:
a TFT substrate having pixels formed in a matrix;
a counter substrate located opposite to the TFT substrate, the counter substrate having a color filter and a black matrix formed thereover; and
liquid crystals arranged between the substrates, wherein the TFT substrate comprises a first electrode formed by solid-coating, an insulating film formed over the first electrode, and a second electrode having a slit at a portion opposing the first electrode over the insulating film, the slit comprises a linear part and a bend part contiguous with the end of the linear part, and
when the insulating film has a thickness of t1 below a linear part and a thickness of t2 at a bend part, a relation of $t2/t1 \leq 0.8$ is satisfied.

2. The liquid crystal display device according to claim 1, wherein
when the insulating film has a thickness of t1 below the linear part and a thickness of t2 at the bend part, a relation of $t2/t1 \leq 0.5$ is satisfied.

3. The liquid crystal display device according to claim 1, wherein
the first electrode is a pixel electrode and the second electrode is a common electrode.

4. The liquid crystal display device according to claim 2, wherein
the first electrode is a pixel electrode and the second electrode is a common electrode.

5. The liquid crystal display device according to claim 1, wherein
the first electrode has a rectangular shape and the second electrode has a linear part slanted in 45° or less relative to a longer side of the rectangular shape.

6. The liquid crystal display device according to claim 2, wherein
the first electrode has a rectangular shape and the second electrode has a linear part slanted in 45° or less relative to a longer side of the rectangular shape.

7. The liquid crystal display device according to claim 1, wherein
the first electrode has a rectangular shape and the second electrode has a linear part slanted in 45° or less relative to a shorter side of the rectangular shape.

8. The liquid crystal display device according to claim 2, wherein
the first electrode has a rectangular shape and the second electrode has a linear part slanted in 45° or less relative to a shorter side of the rectangular shape.

9. A liquid crystal display device comprising:
a TFT substrate having pixels formed in a matrix;
a counter substrate located opposite to the TFT substrate having a color filter and a black matrix formed thereover; and
liquid crystals arranged between the substrates, wherein the TFT substrate comprises a first electrode formed by solid-coating, an insulating film formed over the first electrode, and a second electrode having a slit at a portion opposing to the first electrode formed over the insulating film,
the first electrode has a rectangular shape,
the slit on the second electrode comprises:

a first linear part being slanted by 45° or less relative to a longer side of the rectangular shape;

a second linear part being slanted by 45° or less in the opposite direction to the slanting of the first linear part relative to the longer side of the rectangular shape, the second linear part being contiguous with the first linear part;

a first bend part contiguous with the first linear part; and a second bend part contiguous with the second linear part, and the thickness of the insulating film at a portion where the first linear part and the second linear part are contiguous with each other, and the thickness of the insulating film below the first bend part and the second bend part are smaller than the thickness of the insulating film below the first linear part and the second linear part.

10. A liquid crystal display device comprising:

a TFT substrate having pixels formed in a matrix;

a counter substrate located opposite to the TFT substrate having a color filter and a black matrix formed thereover; and liquid crystals arranged between the substrates, wherein the TFT substrate comprises a first electrode formed by solid-coating, an insulating film formed over the first electrode, and a second electrode having a first and second slit at a portion opposing to the first electrode formed over the insulating film, the first electrode has a rectangular shape, the first slit on the second electrode comprises a first linear part and a first bend part contiguous with the end of the first linear part, the first linear part being slanted by 45° or less relative to a shorter side of the rectangular shape, the second slit on the second electrode comprises a second linear part and a second bend part contiguous with the end of the second linear part, and the second linear part being slanted by 45° or less in the opposite direction to the first linear part relative to the shorter side of the rectangular shape, and the thickness of the insulating film at the first bend part and the second bend part is smaller than the thickness of the insulating film below the first linear part and the second linear part.

* * * * *